US006915116B2

(12) United States Patent
Wang et al.

(10) Patent No.: US 6,915,116 B2
(45) Date of Patent: Jul. 5, 2005

(54) TRANSMISSION DIVERSITY

(75) Inventors: Yan Ivan Wang, Beijing (CN); Risto Wichman, Helsinki (FI)

(73) Assignee: Nokia Networks Oy, Espoo (FI)

( * ) Notice: Subject to any disclaimer, the term of this patent is extended or adjusted under 35 U.S.C. 154(b) by 681 days.

(21) Appl. No.: 09/842,490

(22) Filed: Apr. 25, 2001

(65) Prior Publication Data

US 2001/0024964 A1 Sep. 27, 2001

Related U.S. Application Data

(63) Continuation of application No. PCT/FI00/00760, filed on Sep. 7, 2000.

(30) Foreign Application Priority Data

Sep. 10, 1999 (FI) .............................................. 19991940

(51) Int. Cl.⁷ .............................. H04B 1/02; H04B 7/00
(52) U.S. Cl. ......................... 455/101; 455/69; 455/522; 455/562.1; 375/299
(58) Field of Search ............................... 455/67.11, 69, 455/101, 500, 522, 562.1; 370/281, 334, 342, 343, 347; 375/267, 299

(56) References Cited

U.S. PATENT DOCUMENTS

| | | | | |
|---|---|---|---|---|
| 5,628,052 A | * | 5/1997 | DeSantis et al. | .......... 455/562.1 |
| 5,799,245 A | | 8/1998 | Ohashi | |
| 6,131,016 A | * | 10/2000 | Greenstein et al. | ............ 455/69 |
| 6,553,078 B1 | * | 4/2003 | Akerberg | ..................... 375/267 |
| 6,600,933 B1 | * | 7/2003 | Hiramatsu et al. | ........... 455/522 |

FOREIGN PATENT DOCUMENTS

| | | |
|---|---|---|
| EP | 0741465 | 11/1996 |
| EP | 0 940 936 A1 | 4/1998 |
| JP | 7245577 | 9/1995 |
| WO | WO 93/19537 | 9/1993 |
| WO | WO 98/59433 | 6/1998 |
| WO | WO 99/39454 | 8/1999 |
| WO | WO 99/66743 | 12/1999 |

OTHER PUBLICATIONS

International Search report for PCT/FI00/00760.

* cited by examiner

*Primary Examiner*—Quochien B. Vuong
(74) *Attorney, Agent, or Firm*—Squire, Sanders & Dempsey L.L.P.

(57) ABSTRACT

The present invention is based on the idea that the base transceiver station can make a decision as to changing transmission diversity in response to the power control message sent by the mobile station. The decision to change transmission diversity is made, for instance, on the basis of the result obtained from filtering the power control requests. For example, filtering can be carried out using a sliding window that contains power control information on the basis of which the decision is made. It is not necessary for the mobile station to transmit a special request to change transmission diversity; instead, the decision on changing transmission diversity is made by the base transceiver station in response to the power control information that the mobile station would, in any case, send to the base transceiver station.

9 Claims, 3 Drawing Sheets

TRANSMISSION DIVERSITY

This application is a continuation of international application Ser. No. PCT/FI00/00760, filed 7 Sep. 2000.

FIELD OF THE INVENTION

The present translation relates to the implementation of transmission diversity in mobile communications systems, particularly in WCDMA systems where transmission is based on Frequency Division Duplex (FDD). Transmission diversity refers to the possibility of sending a radio signal using several optional methods over one or more paths, such as several antennas/antenna arrays or transmission frequencies or transmission delays. The potential options are hereinafter referred to as diversity options. For example, when frequency diversity is used, the options comprise of the transmission frequencies available, and when transmitting antenna diversity is used, the options consist of the transmitting antennas available.

BACKGROUND

In mobile communications systems, the goal is that the mobile station connects to the rest of the telecommunications network via the base transceiver station that offers the best transmission path. Communications between the mobile station and base transceiver station takes place over a radio path. Data transmission from the base transceiver station to the mobile station is known as downlink or forward link transmission, and data transmission from the mobile station to the base transceiver station as uplink or reverse link transmission.

Figure 1:
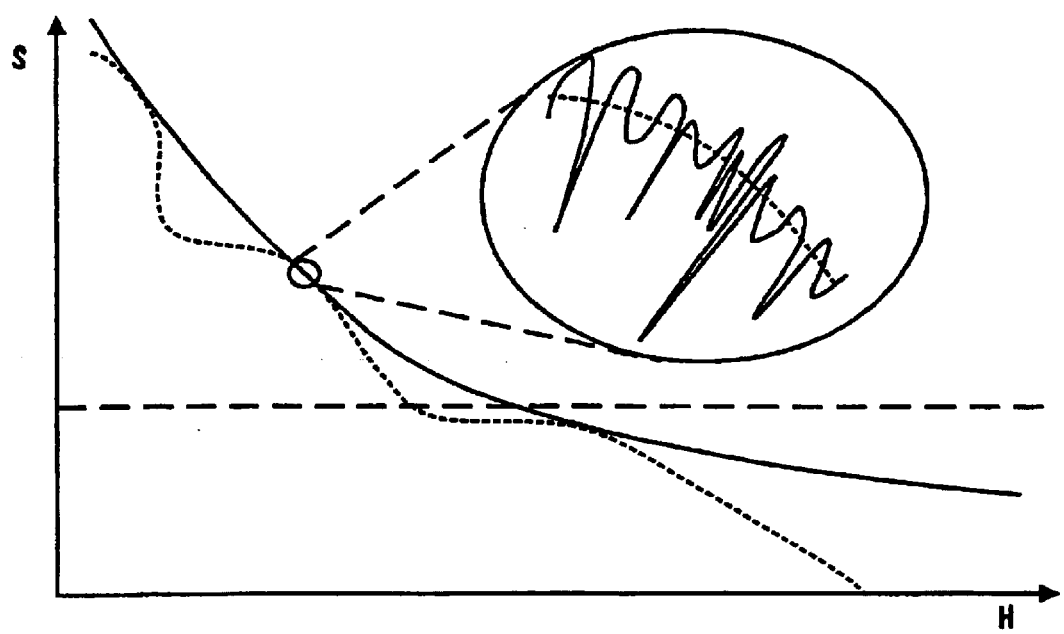

Traffic over radio links is subject to a wide variety of transmission losses and interference. When the distance to the transmitter increases, signal strength in free space decreases by the square of the distance. Viewed from the base transceiver station, a mobile station may also be blocked by a building or hill, which will attenuate the signal. Often, the signal is attenuated by signal reflections. In such a case, the mobile station receives the same signal from several directions, for example due to reflections from buildings. Such reflections either weaken or amplify one another. FIG. 1 illustrates signal attenuation caused by distance, geographical obstructions and reflections. The horizontal axis represents the distance between the base transceiver station and the mobile station and the vertical axis the strength of the signal. The solid line shows signal attenuation in free space, the dotted line the impact of geographical obstructions and expanded detail the effect of reflections (multipath propagation) on the signal. The horizontal dashed line denotes the minimum sensitivity of the assumed mobile station at which it is still capable of detecting the signal.

Similarly, a mobile station that is moving, and/or moving reflective surfaces in its vicinity, attenuate the signal due to the Doppler effect. When the speed at which a mobile station is travelling increases, the level of attenuation per unit of time caused by multipath propagation increases as well. In digital mobile communications systems, reflections and the Doppler effect also cause a phenomenon known as time dispersion, which complicates the identification of a symbol (such as the bit status 0 or 1) arriving via multiple routes.

In mobile communications systems, transmission power is regulated by the mobile station and/or base transceiver station in order to reduce the level of interference in the network and to compensate for fading on the radio path. The idea with power control is to maintain the received signal at a constant yet as low as possible level while at the same ensuring that the quality of the received signal remains optimum. When the level and/or quality of the signal on the radio path between the mobile communications network and the mobile station falls below the preferred standard, transmission power can be adjusted by the base transceiver station and/or mobile station to improve the quality of the radio path. As a rule, transmission power is regulated from the fixed network using a special power control algorithm. The mobile station monitors the strength and quality of the downlink signal from the base transceiver station whereas the active base transceiver station monitors the strength and quality of the uplink signal from the mobile station. Using the results of the measurements and the pre-set power control parameters, the power control algorithm defines the suitable transmission power level that is then transmitted to the mobile station in the form of a power control command. Power control is carried out on an ongoing basis while the call is in progress. In known TDMA mobile communications systems, such as the GSM system, this takes typically place twice per second. Increasing the transmission power increases the level of interference in the network, which is why transmission power levels are kept as low as possible. Transmission power control also offers savings in the mobile station's power consumption.

To offset the effects of fading, i.e. losses and interference, mobile communications systems use methods such as frequency hopping and/or antenna hopping. The efficiency of frequency hopping in counteracting fading is based on frequency dependence. In antenna hopping, the current signal transmission path is replaced by a new path, which alters the fading affecting the signal.

Frequency hopping can be used to reduce co-channel interference caused by signals from several base transceiver stations and the effect of radio path fading on the signal to be transmitted. This is accomplished by changing the frequency used on the radio path according to a predefined frequency hopping pattern. Frequency hopping can be achieved by using carrier frequency hopping or by changing the radio frequency specifically to individual transmitters. Normally, hopping is performed in the cycle of a single burst (time slot).

Another property of the signal to be transmitted that can be changed is its frequency deviation. For example, in a dual antenna array, transmission from one of the antennas may include a minor frequency deviation to simulate fast fading.

Another way of diminishing the impact of fading on the signal to be transmitted is to use antenna hopping, where the signal is transmitted and/or received alternatingly by two or more antennas that are physically separated. Then, the propagation path of the signal to the different antennas is different. Because fading is not only frequency-dependent but also location-dependent, changing the propagation path may improve the propagation conditions. In antenna hopping, the transmitting and/or receiving antenna is changed according to a predefined hopping pattern. Another feature closely associated with antenna hopping is that it is possible to modify or replace the current form and strength of antenna beams. It should be pointed out that antenna/frequency hopping is relatively ineffective against noise, meaning that hopping must be accompanied by error correction, such as channel coding.

It is also possible to use delay diversity at the transmitting end. If, for instance, transmission takes place simultaneously via two antennas, transmission from one of the antennas can be delayed and the duration or phase of the delay, or both, altered.

Error correction, such as channel coding and/or retransmission, and bit interlacing can be used to improve the quality of the transmission and the transmission error tolerance. In channel coding, redundant data is inserted in the data to be transmitted, which makes it possible to detect the original data correctly even if errors were induced in the signal on its transmission path. Retransmission is used for transmission error correction either independently or in addition to channel coding, in which case errors in channel-coded transmission are corrected by retransmitting the distorted frames. Interlacing the bits to be transmitted means that bits of several code words are intermixed, making the bits adjacent to the signal disperse into several bursts. Thanks to interlacing, the signal can normally be detected even if an entire burst were lost in transmission.

The purpose of the present invention is compensate for fading by means of suitable transmission diversity. One known method based on transmission diversity is presented in patent application EP-741 465. In this publication, the mobile station selects the best of the signals from several transmitting antennas and communicates this selection to the base transceiver station that continues to transmit via this particular antenna. The base transceiver station inserts in the first data packet its identifier and sends the first data packet with its identifier via one antenna. Similarly, the base transceiver station inserts in the second data packet its identifier and sends the second data packet with its identifier via another antenna. The mobile station receives both transmissions and compares the received signal levels with each other. After selecting the optimum transmission branch, the mobile station communicates the identifier of the selected packet to the base transceiver station in a control time slot. The base transceiver station will transmit to the mobile station involved via the antenna indicated by the same. According to the publication, signals from several subscriber connections are intermixed in connection with coding before the transmission is routed to the various transmission branches, meaning that all the user data will be sent via the same transmission antenna branch using the transmission diversity disclosed in the publication. The method explained in the publication is also suitable for situations where transmission and reception frequencies differ from each other, i.e. when frequency division duplex FDD is used.

One way of evaluating known techniques is to divide them into systems that use feedback and systems that do not. In feedback systems, the receiver sends measurement data to the transmitter that selects the transmission diversity based on the measurement data. Feedback provides measurement data on the status of the channel, and so these systems perform better than systems that do not make use of feedback and carry out antenna hopping irrespective of whether there is any fading on the channel or not. The drawback of systems using feedback is that the measurement data requires a return path (capacity in the uplink data transmission frame) and that they are more complex than systems that do not make use of feedback data. For example, the antenna hopping pattern described above is part of a system that does not use feedback. By contrast, EP-741 465 is a solution that relies on feedback.

The purpose of the invention is to provide the advantage of feedback when using transmission diversity without taking up any additional capacity in the uplink data transmission frame to indicate the measurement data or selection/change of the preferred diversity option.

A BRIEF SUMMARY OF THE INVENTION

The present invention is based on the idea that the base transceiver station can make the decision on changing transmission diversity in response to the power control message sent by the mobile station. Such a decision could, for instance, be made on the basis of the result obtained from filtering the power control request. Filtering could, for example, be carried out using a sliding window that contains the power control information required for decision-making. The mobile station will not need to send any special request to change transmission diversity; instead, the decision would be made by the base transceiver station in response to the power control information that the mobile station will, in any case, send to the base transceiver station.

LIST OF DRAWINGS

Figure 2:
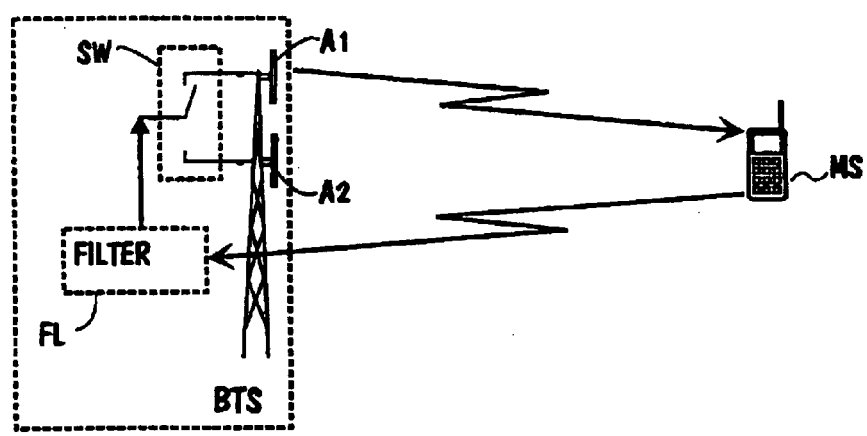
Figure 3:
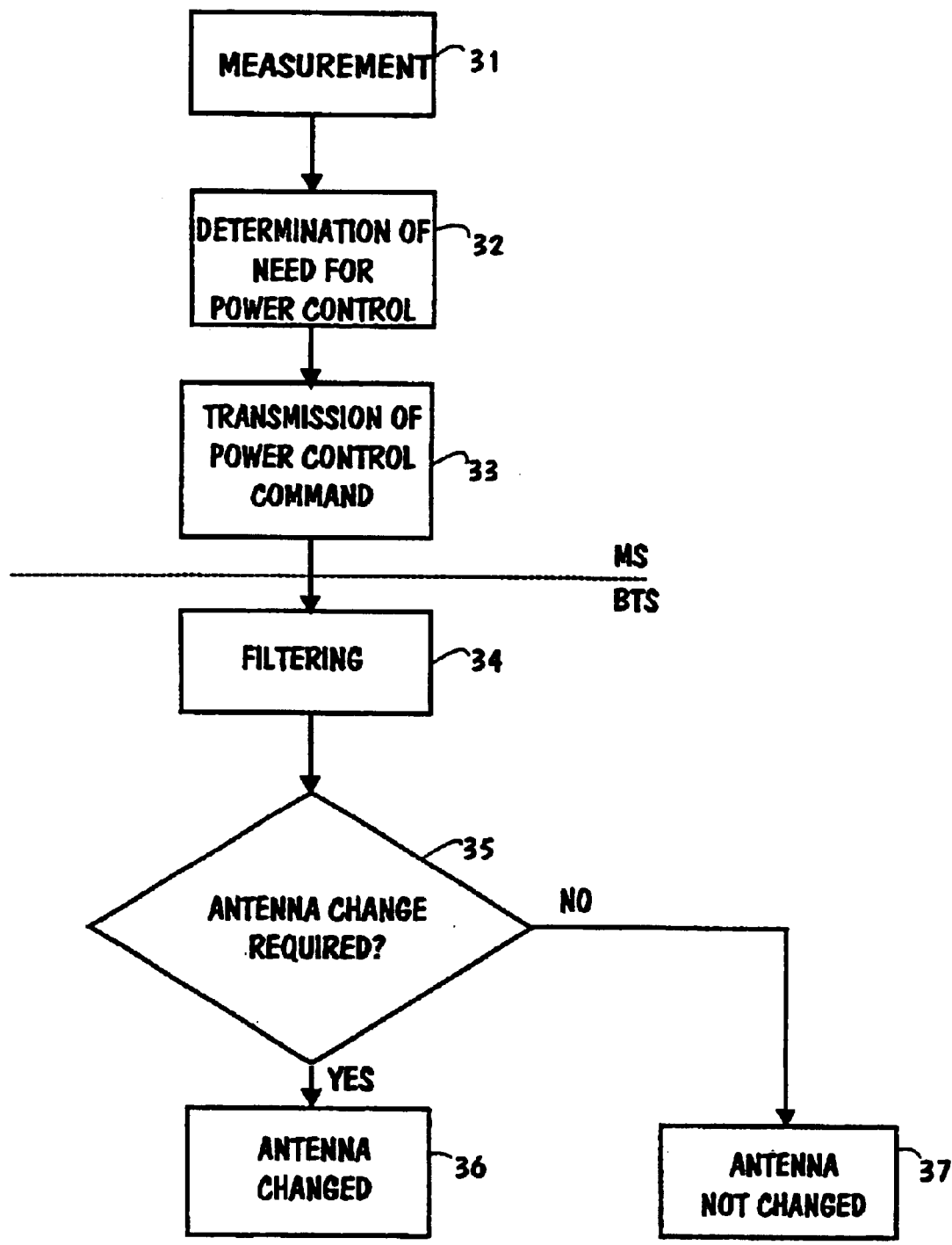
Figure 4:
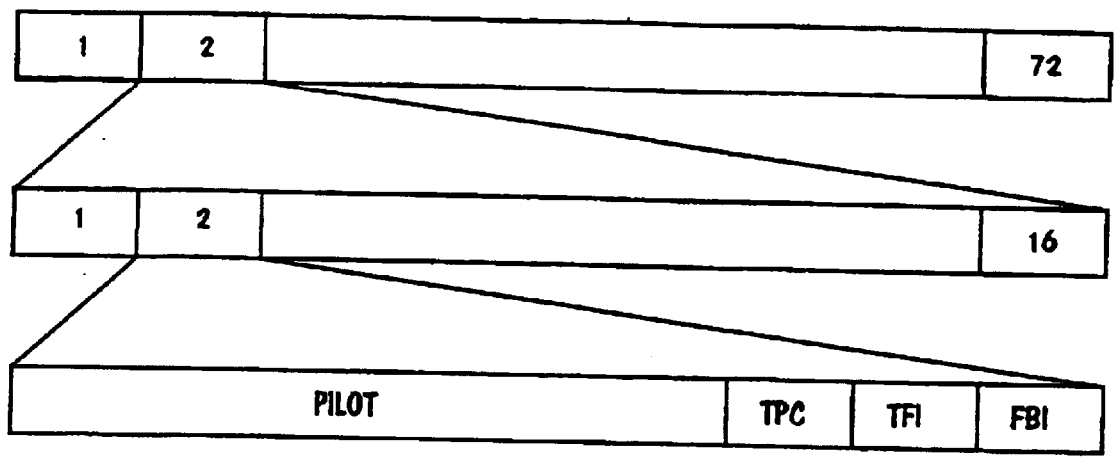
Figure 5:
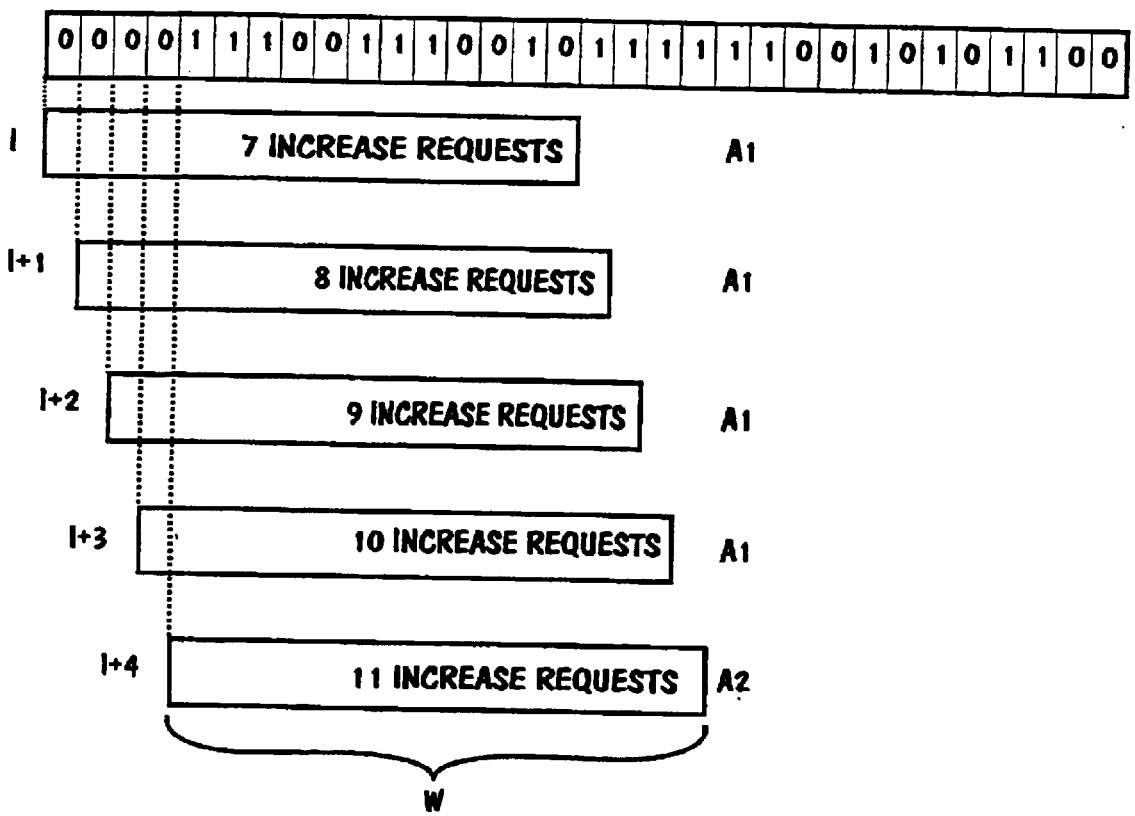

In the following, the invention is explained in more detail with reference to the example given in FIGS. 2 through 5 shown in the attached drawings, where FIG. 1 illustrates the character of various types of fading with the increasing distance between the base transceiver station and the mobile station FIG. 2 shows a system in accordance with the invention FIG. 3 illustrates a method in accordance with the invention FIG. 4 shows the uplink control channel in a FDD-WCDMA system FIG. 5 shows the sliding window used in filtering in accordance with the invention.

A DETAILED DESCRIPTION OF THE INVENTION

Here the invention will be examined using, as an example, antenna diversity, where the transmitting antenna is changed. Naturally, the invention may also be used in connection with the other types of diversity discussed above. FIG. 2 shows the section of a mobile communications system where use is made of the method in accordance with the invention. FIG. 3 illustrates the same invention in form of a flow chart. The mobile station MS monitors (phase 31) the signal received from the base transceiver station BTS for properties such as strength and error rate using a known method. Based on the measurements, the mobile station sends (phase 32) to the base transceiver station, via the uplink path, a request either to increase or decrease transmission power (phase 33). At the base transceiver station, the control element FL filters (phase 34) the power control requests received, and the result of the filtering process is used as a basis for deciding (phase 35) whether transmission should be switched to another antenna. If so, the control element FL gives a command to the switching element SW to change (phase 36) the transmitting antenna/antenna array—if not, the antenna/antenna array will not be changed (phase 37). The initial operations associated with the method (phases 31 through 33) take place in the mobile station in a known way and the final operations (phases 34 through 37) at the base transceiver station. This division is denoted in FIG. 3 by a dashed line.

FIG. 4 provides an example of the uplink control channel in an FDD-WCDMA system. It consists of a master frame that contains 72 frames each with 16 time slots. The time slot is divided into the pilot, TPC, TFI and FBI fields. The pilot field is used, among other things, to convey the estimate data, the TPC field for power control, the TFI field for the hash code information and the FBI field for conveying, for example, the transmission diversity data item. Thus, the information calling for an increase or decrease in transmission power is carried in the TPC field. Consequently, there is no need to use the FBI field capacity for sending the transmission diversity data, making it possible to use the saved capacity for other purposes. The duration of a time slot is 0.625 ms, which is equivalent to the duration of the power control period.

Let us assume that the power control command can be given using a single bit requesting that transmission power either be increased or decreased so that the value 1 is a request to increase and the value 0 a request to decrease power. If the base transceiver station receives several 1s within a given period of time, it may mean that that transmitting mobile station is in a fading pit. Then, the base transceiver station can switch to another transmission antenna/antenna array.

To reduce errors, it is advisable to use a sliding window that moves in step with the power control period; in the example given in FIG. 4, it would move time slot by time slot. Let us use the FDD-WCDMA system as an example. Let us assume that the window size is W time slots and B (B<W) is the threshold value (number of 1s) for changing the antenna. If the number of is within the window received is equal to or more than B, transmission will be switched to another antenna; if not, transmission will continue using the current antenna. Switch-back to the first antenna can be delayed in a situation where the mobile station continues sending 1s despite the antenna change in order to eliminate recurring antenna changes. In other words, a slight delay that prevents a new antenna change immediately after the previous change ensures that the mobile station is given enough time to measure the properties of the signal transmitted by the second antenna. FIG. 5 illustrates the power control commands sent to the base transceiver station in each time slot and how the sliding window is used. At the top, the figure shows the power control requests transmitted by the mobile station in the TPC field of each time slot, where 1stands for "up" and 0 for "down". I represents the point in time and A1 or A2 the transmitting antenna. The window size W is 16 time slots and the threshold value B is equivalent to 11 "up" commands. The figure shows that antenna change takes place at the point of time I+4.

By varying the values of W and B, it is possible to regulate the propensity for antenna change and its error sensitivity. What is worth noting about the solution suggested by the invention is that the mobile station need not send special measurement data or antenna change request in the FBI field, which saves uplink capacity. Moreover, the invention is easy to implement because it makes use of existing power control mechanisms. The invention is best suited for situations where the speed at which the mobile station travels is low, typically within the range of 0 to 50 km/h.

In the foregoing, a certain kind of filter was used for decision-making concerning antenna change to filter the necessary 1 bits from the power control messages. For filtering, a "lookup table" may also be used where all the possible variations of the contents of the sliding window are stored. When the power control string in the sliding window is of a certain type, a matching row is read from the table to implement the predefined action stored in the table either to change the antenna or keep the existing antenna. There are other ways of implementing decision-making by means of power control messages in addition to the sliding window and lookup table discussed above, such as a counter that clocks the number of successive "up" messages, which is then used to determine whether the antenna should be changed. However, this method is more prone to transmission errors, which increases the probability of an incorrect antenna change. The invention can be used in any mobile communications system, such as a TDMA system, where a power control request is obtained from the mobile station. However, it is obvious that the invention can be used in other radio systems within the scope of the invention.

What is claimed is:

1. A method to implement transmission diversity in a radio system comprising at least one receiving unit and at least one transmitting unit, in which radio system the at least one receiving unit and the at least one transmitting unit set up a data transmission connection over a radio path, the method comprising:

transmitting a signal to the at least one receiving unit using a preferred transmission diversity option;

monitoring the signal by the at least one receiving unit for quality;

sending feedback data comprising power control messages from the at least one receiving unit to the at least one transmitting unit based on the monitoring; and selecting a transmission diversity option based on the feedback data wherein the at least one transmitting unit filters the feedback data required for the selection of the transmission diversity option from the power control message, and wherein filtering is carried out by counting the number of certain type of power control messages from a sliding window comprising number of successive power control messages.

2. A method to implement transmission diversity in a radio system comprising at least one receiving unit and at least one transmitting unit, in which radio system the at least one receiving unit and the at least one transmitting unit set up a data transmission connection over a radio path, the method comprising:

transmitting a signal to the at least one receiving unit using a preferred transmission diversity option;

monitoring the signal by the at least one receiving unit for quality;

sending feedback data comprising power control messages from the at least one receiving unit to the at least one transmitting unit based on the monitoring; and selecting a transmission diversity option based on the feedback data;

wherein the transmitting unit filters the feedback data required for the selection of the transmission diversity option from the power control message, and wherein filtering is carried out by means of a table that includes all the possible variations of the power control message strings contained in a sliding window.

3. A method to implement transmission diversity in a radio system comprising at least one receiving unit and at least one transmitting unit, in which radio system the at least one receiving unit and the at least one transmitting unit set up a data transmission connection over a radio path, the method comprising:

transmitting a signal to the at least one receiving unit using a preferred transmission diversity option;

monitoring the signal by the at least one receiving unit for quality;

sending feedback data comprising power control messages from the at least one receiving unit to the at least one transmitting unit based on the monitoring; and selecting a transmission diversity option based on the feedback data wherein the at least one transmitting unit continuously counts the number of certain type of incoming successive power control messages, and when the said number reaches a certain predefined value, a decision is made on the diversity option to be used and whenever a different type of power control message is received, the count is reset.

4. An arrangement for implementing transmission diversity in a radio system comprising at least one receiving unit and at least one transmitting unit, in which radio system the at least one receiving unit and the at least one transmitting unit are configured to set up a data transmission connection over a radio path, the arrangement incorporating:

measuring elements on the at least one receiving unit configured to measure properties of a signal received thereby;

feedback elements configured to transmit transmission diversity data comprising power control messages to the at least one transmitting unit based on said measurement;

in the at least one transmitting unit, control elements functionally connected to switching elements and configured to control the switching elements in response to the power control messages received; and the switching elements configured to select a transmission diversity option, wherein the control elements contain filtering elements for filtering the power control massage, wherein the filter uses a sliding window in such a way that only a certain type of power control message strings are responded to.

5. An arrangement according to claim 4, wherein the radio system comprises a mobile communications system.

6. An arrangement for implementing transmission diversity in a radio system comprising at least one receiving unit and at least one transmitting unit, in which radio system the at least one receiving unit and the at least one transmitting unit are configured to set up a data transmission connection over a radio path, the arrangement incorporating:

measuring elements on the at least one receiving unit configured to measure properties of a signal received thereby;

feedback elements configured to transmit transmission diversity data comprising power control messages to the at least one transmitting unit based on said measurement;

in the at least one transmitting unit, control elements functionally connected to switching elements and configured to control the switching elements in response to the power control messages received; and the switching elements configured to select a transmission diversity option, wherein the control elements contain filtering elements for filtering the power control messages, wherein the filter uses a sliding window in such a way that only a certain type of power control message string is responded to.

7. An arrangement according to claim 6, wherein the radio system comprises a mobile communications system.

8. An arrangement for implementing transmission diversity in a radio system comprising at least one receiving unit and at least one transmitting unit, in which radio system the at least one receiving unit and the at least one transmitting unit are configured to set up a data transmission connection over a radio path, the arrangement incorporating:

measuring elements on the at least one receiving unit configured to measure properties of a signal received thereby;

feedback elements configured to transmit transmission diversity data comprising power control messages to the at least one transmitting unit based on said measurement;

in the at least one transmitting unit, control elements functionally connected to switching elements and configured to control the switching elements in response to the power control messages received; and the switching elements configured to select a transmission diversity option, wherein the control elements contain a counter that counts the number of certain type of successive power control messages.

9. An arrangement according to claim 8, wherein the radio system comprises a mobile communications system.

* * * * *